July 23, 1957 P. H. ROSENBERG 2,799,985
ROTARY LAWN MOWER SAFETY BLADE
Filed May 26, 1954
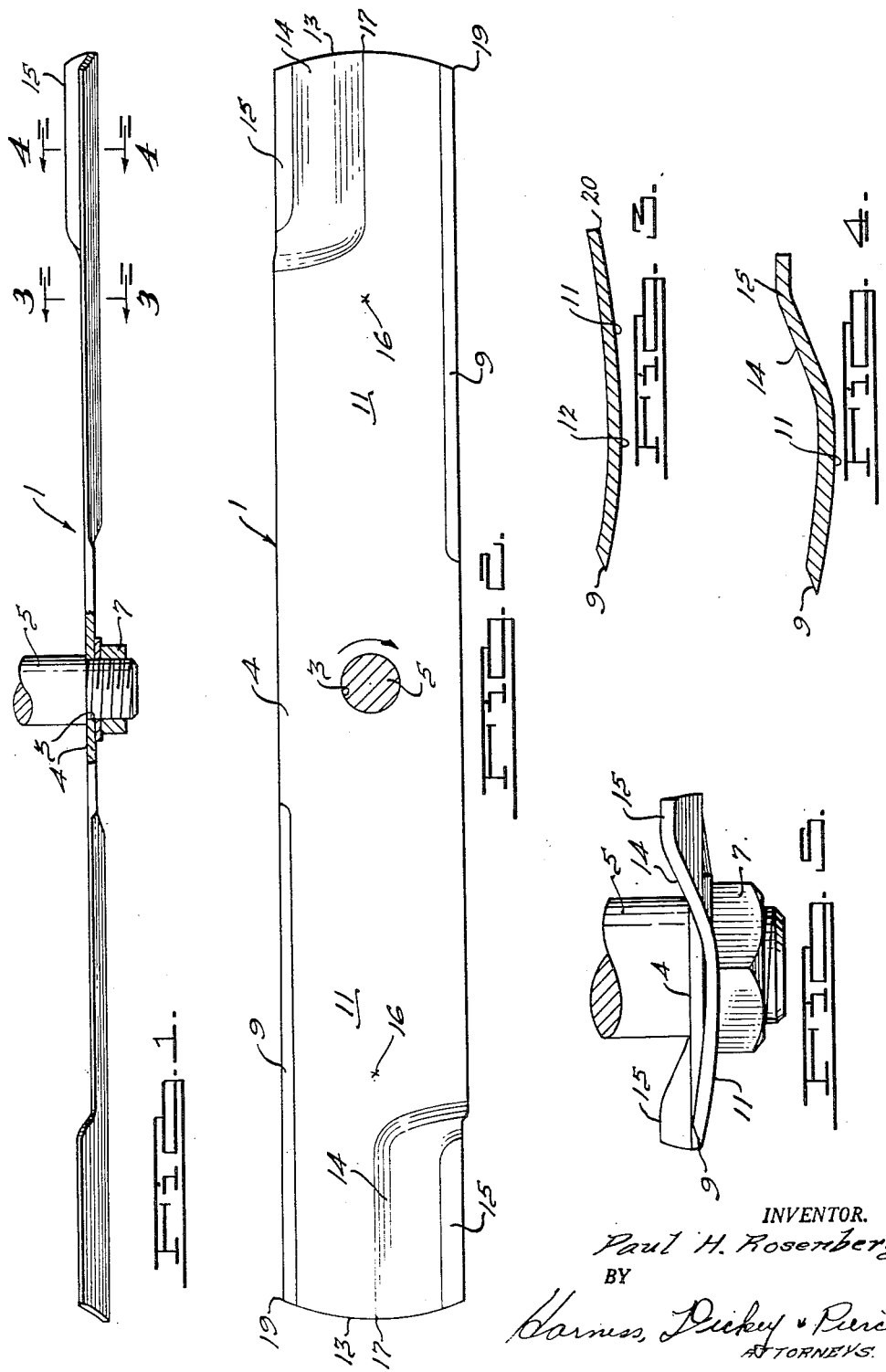
INVENTOR.
Paul H. Rosenberg.
BY
Harness, Dickey & Pierce.
ATTORNEYS.

United States Patent Office 2,799,985
Patented July 23, 1957

2,799,985
ROTARY LAWN MOWER SAFETY BLADE

Paul H. Rosenberg, Lansing, Mich., assignor, by mesne assignments, to Motor Wheel Corporation, Lansing, Mich., a corporation of Michigan Application May 26, 1954, Serial No. 432,443

2 Claims. (Cl. 56—295)

My invention relates to cutters for rotary lawn mowers and the like and it is a particular object of my invention to provide a cutter incorporating safety features which make it virtually impossible for a person to thrust his foot or hand against the cutting edge when the blade is rotating at operating speed.

In its presently preferred embodiment, a cutter according to my invention is in the form of a blade with its axis of rotation at the center and with radially extending cutting edges on opposite sides of the axis. The bottom of the blade is convex and the tips of the blade are also convex. This locates the cutting edges upwardly of the bottom of the blade and inwardly of the outer peripheral edge and at the high speeds at which the blade is rotated it is very difficult for a person to insert an object into the blade at operating speed without contacting the bottom or the outer edge before reaching a cutting edge. The shapes of the bottom and the tip are such that they tend to drive an object contacting them away from the blade.

The invention is illustrated in the accompanying drawings in which:

Figure 1 is a side elevation, partly in section, of a blade mounted on a rotary shaft;

Fig. 2 is a top plan view of the blade of Fig. 1;

Fig. 3 is an enlarged section on line 3—3 of Fig. 1;

Fig. 4 is an enlarged section on line 4—4 of Fig. 1; and

Fig. 5 is an enlarged end elevation of the blade taken from the right of Fig. 1.

The blade 1 shown in the drawings is of a type used on rotary power lawn mowers. It is generally rectangular in shape and has a center opening 3 whereby it is clamped at its flat center portion 4 to the rotary drive shaft 5 by nut 7 to form a center of rotation. Along opposite longitudinal edges and adjacent its opposite ends, the blade is provided with cutting edges 9. Coextensive with the length of the edges 9 the blade 1 is curved in cross section to provide downwardly presenting convex portions 11, the apex 12 of each being in a plane below the plane of the cutting edges 9. The upper face of the blade through the extent of cutting edges is concave as shown. Adjacent the tips 13 of the blade, the trailing edge portions 14 of portions 11 may be curved upwardly above the curvature of portions 11 (compare Figs. 3 and 4). This curvature tends to create a slight suction back of the blade acting to straighten up the grass and facilitate proper mowing. The rear ends of the edges 14 are preferably flattened as shown at 15 into a plane normal to the axis of rotation so that no sharp corners will be contacted by movement parallel to the axis into the trailing edge. The tips 13 of the blade are convex outwardly on centers 16, so that apex 17 is on a greater radius than the outer corner 19 of the adjacent cutting edge 9.

In use, the blade 1 is rotated at high R. P. M., and it is highly improbable that a person will be able to move his foot radially into the area or surface of revolution of the blade without contacting tips 13. These will propel the foot back from the cutter and prevent contact of the foot with the cutting edges 9. If the foot is accidentally placed under the blade 1, it will contact the bottom faces of portions 11 before it can be raised high enough to contact edges 9 and these will drive the foot down and away from the edges. If contact is made with the trailing edge it will be with the flat surface 15 rather than with a sharp corner 20 such as shown at the rear edge in Fig. 3.

Modifications may be made in the structure shown without departing from the spirit and scope of the invention.

What is claimed is:

1. In a rotary cutter for a lawn mower, a substantially rectangular blade adapted to be rotated about its center in a substantially horizontal plane, said blade having a pair of cutting edges, one extending along one longitudinal edge of the blade to one end thereof and the other extending along the opposite longitudinal edge of the blade to the opposite end of the blade, said blade in transverse section at said cutting edges being of arcuate shape with its upper face being concave and its lower face being convex, the opposite longitudinal edges of the blade being disposed in a plane above the lower face of the blade along its longitudinal center line and the opposite end edges of the blade being of arcuate shape in horizontal projection so that the opposite ends of the blade at the longitudinal center line thereof project radially outwardly beyond the intersection between the longitudinal edges of the blade and said arcuate end edges.

2. A blade as called for in claim 1 wherein said cutting edges form the leading edges of the blade when rotated and wherein the opposite longitudinal edges form the trailing edges of the blade, said trailing edges adjacent the outer end portions being substantially flat and offset vertically upwardly relative to said cutting edges.

References Cited in the file of this patent

UNITED STATES PATENTS

| | | |
|---|---|---|
| D. 145,438 | Goodall | Aug. 20, 1946 |
| 1,407,417 | Huelves | Feb. 21, 1922 |
| 2,502,696 | Barnes | Apr. 4, 1950 |
| 2,539,779 | Grosso | Jan. 30, 1951 |
| 2,571,455 | Keiper | Oct. 16, 1951 |
| 2,648,187 | Ries | Aug. 11, 1953 |
| 2,687,607 | Sewell | Aug. 31, 1954 |
| 2,739,437 | True | Mar. 27, 1956 |